US011032708B2

(12) United States Patent
Hsiao et al.

(10) Patent No.: US 11,032,708 B2
(45) Date of Patent: Jun. 8, 2021

(54) SECURING PUBLIC WLAN HOTSPOT NETWORK ACCESS

(71) Applicant: International Business Machines Corporation, Armonk, NY (US)

(72) Inventors: Chih-Wei Hsiao, Taipei (TW); Wei-Hsiang Hsiung, Taipei (TW); Chih-Wen Chao, Taipei (TW); Sheng Hao Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/142,116

(22) Filed: Sep. 26, 2018

(65) Prior Publication Data

US 2020/0100107 A1   Mar. 26, 2020

(51) Int. Cl.
*H04W 12/08* (2021.01)
*H04L 29/06* (2006.01)
(Continued)

(52) U.S. Cl.
CPC .......... *H04W 12/08* (2013.01); *H04L 9/0861* (2013.01); *H04L 41/0803* (2013.01); *H04L 63/0471* (2013.01); *H04L 63/20* (2013.01); *H04W 12/06* (2013.01); *H04L 2209/76* (2013.01); *H04L 2209/80* (2013.01); *H04W 84/12* (2013.01)

(58) Field of Classification Search
CPC ..... H04W 12/08; H04W 12/06; H04W 84/12; H04W 12/04; H04W 12/02; H04L 9/0861; H04L 41/0803; H04L 63/0471; H04L 63/20; H04L 2209/80; H04L 2209/76
See application file for complete search history.

(56) References Cited

U.S. PATENT DOCUMENTS 8,176,328 B2   5/2012   Chen et al.
9,603,021 B2   3/2017   Scahill et al.
(Continued)

FOREIGN PATENT DOCUMENTS

CN   103634794 A   3/2014
CN   104270440 A   1/2015
(Continued)

OTHER PUBLICATIONS

Mell et al., "The NIST Definition of Cloud Computing", Recommendations of the National Institute of Standards and Technology, Special Publication 800-145, Sep. 2011, 7 pages.
(Continued)

*Primary Examiner* — Cheng-Feng Huang
(74) *Attorney, Agent, or Firm* — David K. Mattheis; William H. Hartwell; Nicholas L. Cadmus

(57) ABSTRACT

Securing public hotspot communications by: generating a public-private key pair, deriving an SSID using the generated public key, creating a network using the SSID, specifying a network security setting, and providing a Client the SSID and network security settings. Further, by: receiving a network connection request from the Client, establishing a connection with the Client, receiving a probe request from a network access point, sending an authentication message, receiving SSID configuration information from the network access point, associating the SSID network and the network access point, and receiving Client data.

17 Claims, 5 Drawing Sheets

(51) Int. Cl.
  *H04W 12/06* (2021.01)
  *H04L 12/24* (2006.01)
  *H04L 9/08* (2006.01)
  *H04W 84/12* (2009.01)

(56) References Cited

U.S. PATENT DOCUMENTS

| | | | |
|---|---|---|---|
| 9,686,808 B2 | 6/2017 | Ghai | |
| 9,705,913 B2 | 7/2017 | Mirashrafi et al. | |
| 2006/0064589 A1* | 3/2006 | Taniguchi | H04W 12/35 |
| | | | 713/170 |
| 2007/0130617 A1* | 6/2007 | Durfee | H04L 9/321 |
| | | | 726/5 |
| 2007/0186105 A1* | 8/2007 | Bailey | H04L 63/0492 |
| | | | 713/168 |
| 2010/0070771 A1* | 3/2010 | Chen | H04L 63/0823 |
| | | | 713/176 |
| 2010/0146614 A1* | 6/2010 | Savoor | H04W 12/069 |
| | | | 726/10 |
| 2011/0167263 A1* | 7/2011 | Cross | H04L 9/3268 |
| | | | 713/168 |
| 2013/0034090 A1* | 2/2013 | Thomas | H04W 48/04 |
| | | | 370/338 |
| 2013/0173702 A1* | 7/2013 | Lang | H04L 41/0846 |
| | | | 709/204 |
| 2014/0269535 A1 | 9/2014 | Pazhyannur et al. | |
| 2014/0325079 A1* | 10/2014 | Savolainen | H04L 61/2015 |
| | | | 709/227 |
| 2017/0099259 A1* | 4/2017 | Joe | H04W 12/0017 |
| 2017/0164196 A1 | 6/2017 | Bryksa et al. | |
| 2017/0195318 A1* | 7/2017 | Liu | H04L 67/2809 |
| 2019/0075465 A1* | 3/2019 | Grutzmacher | H04W 12/08 |
| 2019/0253243 A1* | 8/2019 | Zimmerman | H04L 9/3247 |

FOREIGN PATENT DOCUMENTS

| | | |
|---|---|---|
| WO | 2014174343 A1 | 10/2014 |
| WO | 2016011824 A1 | 1/2016 |

OTHER PUBLICATIONS

Raju et al., "Secure Hotspot a Novel Approach to Secure Public Wi-Fi Hotspot", 2015 International Conference on Control, Communication & Computing India (ICCC), Nov. 19-21, 2015, Trivandrum, pp. 642-646, <http://ieeexplore.ieee.org/abstract/document/7432975/>.

Cisco, "A Comprehensive Review of 802.11 Wireless LAN Security and the CISCO Wireless Security Suite", Wireless LAN Security White Paper, printed on Oct. 9, 2017, 40 pages, <https://www.cisco.com/c/en/us/products/collateral/wireless/aironet-1200-access-point/prod_white_paper09186a00800b469f.html>.

* cited by examiner

SECURING PUBLIC WLAN HOTSPOT NETWORK ACCESS

BACKGROUND

The invention relates generally to securing wireless network communications traffic, and particularly to securing wireless network communications originating through a public WLAN hotspot.

Using a public WLAN hotspot at an internet café, coffee shop, airport or other location provides convenience but fails to offer the protection afforded by a home or office wireless network. Public Hotspots typically offer little real security. Reliance upon relatively weak captive portal authentication to afford users access to the Internet carries implicit risks. Hotspots may expose the user to peer-to-peer attacks, viruses, hijacking, data theft or manipulation, eavesdropping attacks and other malicious events. Hotspots typically do not deploy intrusion protection systems (IPS) to monitor the already insecure connections, leaving users vulnerable to attacks.

Mobile computing, including the use of smart phones and portable computers, continues to increase, as does reliance upon public hotspots to provide the bandwidth for network activities. These increases are accompanied by an increase in the number, variety, and sophistication of malicious attacks revolving around the open nature of the wireless communications traffic used at a public hotspot.

SUMMARY

Aspects of the invention disclose methods, systems and computer readable media associated with securing wireless network communications traffic by generating a public-private key pair; deriving an SSID using the generated public key; creating a network using the SSID; specifying a network security setting; providing a Client the SSID and network security settings; receiving a network connection request from Client; establishing a connection with Client, receiving a probe request from a network access point; sending an authentication message; receiving SSID configuration information from the network access point; associating the Host and the network access point; receiving data from Client through the network access point.

Aspects of the invention disclose methods systems and tangible computer readable media associated with securing wireless network communications traffic by receiving SSID and security settings from a Host, submitting a connection request to the Host, receiving a connection to the Host; probing the SSID via a network access point; associating with the SSID via the network access point.

DETAILED DESCRIPTION

Figure 1:
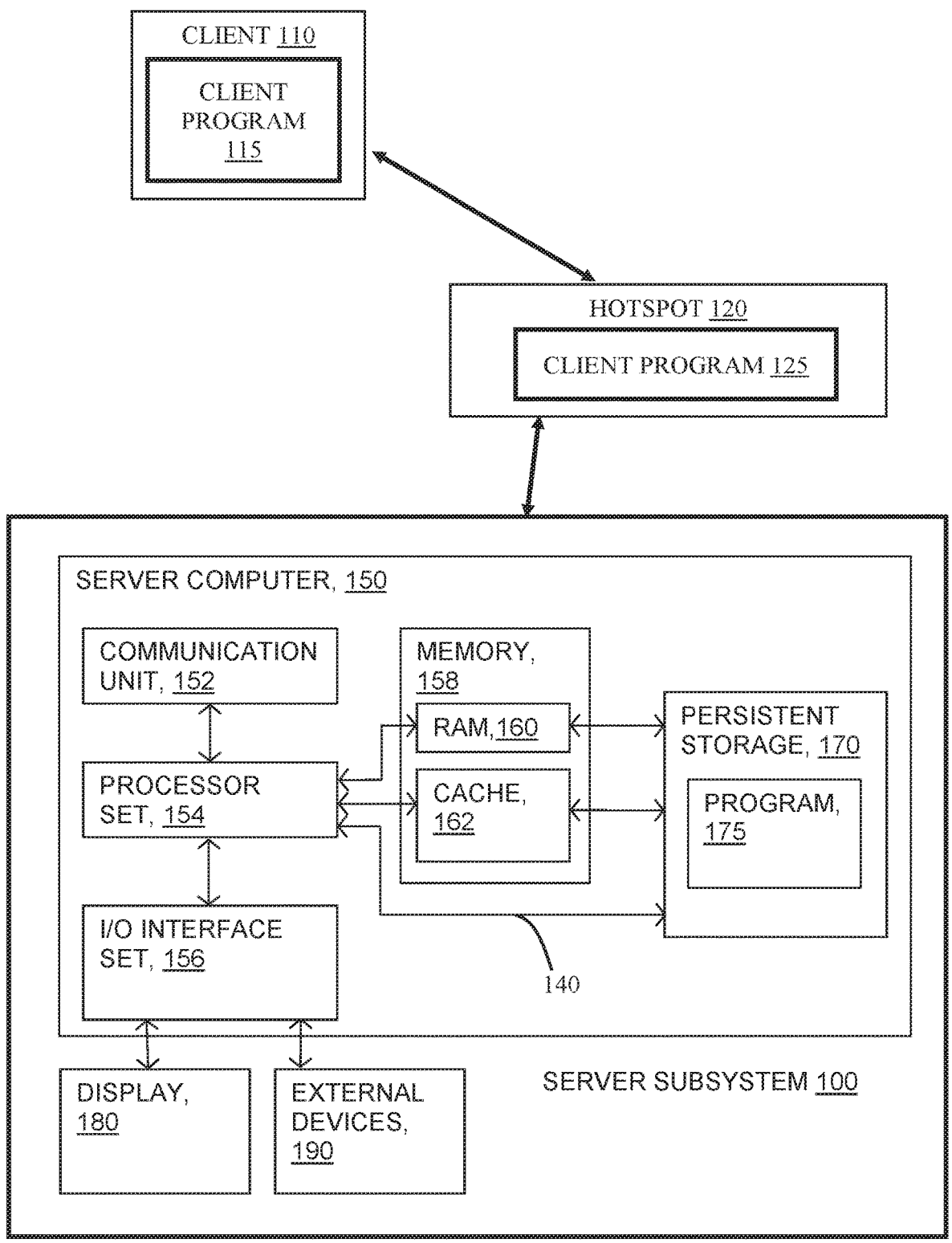
FIG. 1 provides a schematic illustration of a system, according to an embodiment of the invention.

In an embodiment, a mobile device connects to a trusted network Access Point having a Host SSID using security settings associated with the Host SSID and provided to the user of the mobile device. The Host may be a home network wireless router, an office network wireless router or a cloud based SSID. The Host has previously created a private-public key pair using a key pair cryptography method, such as RSA, and used the public key to generate the SSID for the network. The Host has registered the SSID together with its IP address, in an SSID address database. When the user moves out of range of the Host SSID, the mobile device continues to probe for the Host SSID. As the mobile device moves into range of a public hotspot, the device connects to the hotspot and continues to probe for the Host SSID using the resources of the hotspot. The hotspot utilizes the Host SSID probe request data to query the IP address of the Host SSID from a Domain Name System server. Using the provided IP address, the hotspot access point (AP) probes the Host SSID. The Host SSID responds to the AP with an authentication message including the SSID and the public key. The AP uses the content of the authentication message to verify the SSID of the Host. The AP connects to the Host, the mobile device connects to the AP and then to the Host which is once again in range of the mobile device through the AP.

In this embodiment, the mobile device or Client, is configured to connect to the Host using provided SSID and security setting information. The connection occurs when the Client is in range of the Host network. The user of the Client device is provided with the SSID and security settings necessary to establish the initial connection with the Host. While in range of the Host, the Client sends a probe request for the SSID. Upon receipt of the probe request, the SSID sends a probe response to the Client. The Client and SSID exchange authentication frames. The Client becomes authenticated by the SSID, then associated with the SSID and then proceeds to a higher level of authentication with the Host. Higher levels of authentication are achieved using the provided security setting information such as WPA, or WPA2 information including a password for access becoming authenticated with the Host and able to exchange encrypted data frames.

In this embodiment, the Client moves out of range of the SSID and ceases to exchange data. The Client continues to probe for the SSID. The Client comes into range of an unsecured public WLAN hotspot and proceeds to connect at a low level using IEEE 802.11 protocols. The Client then passes the probe request for the Host SSID to the hotspot AP. The AP sends the probe to the Internet and receives the IP address of the Host SSID from the SSID name service. The AP then sends a connection request to the Host SSID. The Host responds with an authentication message. The message comprises the SSID, the public key and a signature derived from a hash of the SSID plus the public key and the Host's private key. The AP derives the hash of the SSID and public key from the signature using a verification algorithm and the provided public key, and compares the derived hash with a hash generated using the provided SSID and public key.

In an embodiment, a public-private key (PPK) pair is generated by a system Host. The PPK may be generated using known methods such as RSA and SSH encryption key generation methods. The public key of the PPK is then used to derive a SSID (service set identification) network name. The public key may be used directly as the SSID, or the public key may be modified using a reversible algorithm with the result being used as the SSID. In an embodiment, the public key is hashed using the SHA256 function. The hash digest is encoded to a text string using a text encoding algorithm such as the Base64 function. The result is used as the SSID.

As an example, an RSA public private key pair having a public key of: AAAAB3NzaC1lyc2EAAAABJQAAAQEAm+zjF6T7iUzwFlLan6jfbM2cR1NCucB4Awob+3erMz2IOz999H8zGE5tfWKf504uvV+duk9AxRCqlPPt9ts5YWK2o8s6I5zpwE2eTRwduEQCk3hsomkLEfCU5+Tu7RuylkYUKQVJB 5Hr4HzcFC7x8F2B4y2j FPpgPa8Li+vv1NXOlawnGFKrXX G0rTL7elE01oatBHHAzWVORA4KTvSJwxYOORq8BLhG50D+AsZ2DcdmODhm+yEQR47d pzbAFzgEJMrOBh81WRCRsALSuw2jpHn5KK8jrRWV7tEZuq9D+zMKc8faLazfXcn4ibbfaNn mjdJW24uRDFhTurnFqMsk9Q== may be generated using PuTTYgen utility software available from WinSCP.net.

The public key of this example may then be hashed using the SHA256 function yielding: E0461F2C8F2F85605364230448E0EB12B3FE6D269A4257C1C99F8A58EC9AC97D. The hash may then be converted to a text string using the Base64 function: RTAONjFGMkM4RjJGODU2MDUzNjQyMzAONDhFMEVCMTJCMOZFNkQyNjlBNDI1N0MxQzk5RjhBNThFQzlBQzk3RA==, which is then used as the SSID name and is registered together with the IP address.

The derived SSID is used to establish a wireless local area network (WLAN) having pre-determined security settings. The SSID is registered in an internet connected database utilizing the DNS or an analogous system to store the SSID and associated IP address. The database may be provided as a cloud service accessible by network access points.

The SSID and associated security settings are then passed from the Host to a Client. The information may be passed to the Client using email, sms, hard copy or other communication means. The Client then utilizes the provided information to establish a wireless connection with the WLAN having the SSID derived from the public key. The Client probes the SSID, the Host receives the probe request, authenticates and associates with the Client at a low level of the 802.11 network connection protocol. The security settings are then used by the Client and the Host to authenticate each other and establish a higher level encrypted connection using the WLAN.

In an embodiment, the Host sends a value to the Client. The Client encrypts a combination of the value and a new value generated by the Client using the security settings of the SSID and sends the result to the Host. The Host decrypts the received message to confirm the Client's authenticity. The Host may then encrypt the Client value and send the result to the Client. The Client may then decrypt the received message to authenticate the Host and send a message indicating that authentication has occurred.

After the Client has moved beyond the range of the wireless WLAN the connection with the SSID will be dropped. The Client may then move into range of an unsecured wireless hotspot having open security settings. The Client may send probe requests for the SSID. The hotspot may receive these requests and may authenticate the Client and associate with the Client at a low level as the hotspot security is open. The hotspot may send a request for the IP address of the SSID to the SSID database. The hotspot may then send a probe request to the SSID IP address.

Responsive to receipt of the probe request, the Host may respond with an authentication message. The authentication message comprises the SSID, the public key and a digital signature derived from the hash of the SSID and public key combined. The hotspot may derive the public key from the message and then verify that the SSID is derived from the public key. Responsive to that verification, the hotspot uses the public key to verify the digital signature. After verifying the SSID and Host, the hotspot sends SSID configuration information including security settings received from the Client, to the Host. Responsive to the receipt of the SSID configuration information, the Host may associate with the hotspot enabling the hotspot to create an IP connection under 802.11 to pass encrypted data packets from the Client to the Host through the hotspot using the SSID.

In this embodiment, the Host receives the encrypted packets from the Client. The Host decrypts the packets using the SSID security settings. The decrypted data may then be used to facilitate the request of the Client. The Client may request information from a particular internet resource through the encrypted packet data. The Host decrypts the packets and submits the request to a network element, or elements, of the internet on behalf of the Client. Upon receipt of the requested information, the Host encrypts the received information and passes the response to the Client as encrypted packets through the hotspot connection. In this example, the hotspot, or anyone eavesdropping on the Client via the hotspot sees only encrypted packets and has no access to actual data.

FIG. 1 provides a schematic illustration of network resources associated with practicing the disclosed inventions. As shown in the figure, a networked Client device 110 connects wirelessly to a hotspot 120. Client device 110 comprises Client secure communications program 115 together with sufficient computing resource (processor, memory, network communications hardware) to execute the Client secure communications program. Hotspot 120 comprises a public WiFi hotspot including software program 125 for the purpose of sending and receiving network communications traffic as well as establishing network communications linkages. The hotspot connects to a server subsystem 100. As shown in FIG. 1, server subsystem 100 comprises a server computer 150. FIG. 1 depicts a block diagram of components of server computer 150 within server subsystem 100 of FIG. 1, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, including random access memory 160 and cache memory 162, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the secure communications program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, 106, 108, 110, and 112. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., secure communications program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
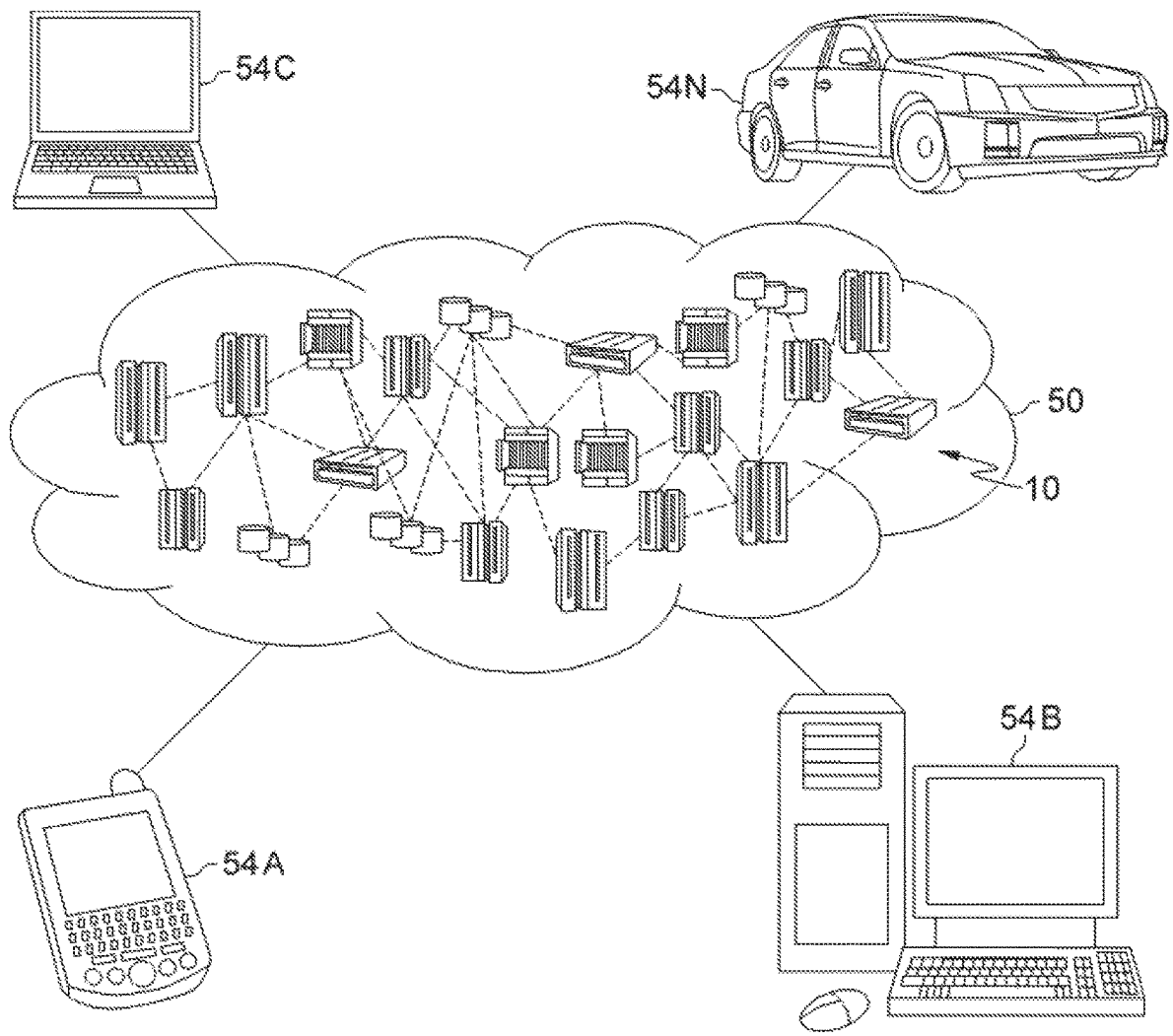
FIG. 2 depicts a cloud computing environment, according to an embodiment of the invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
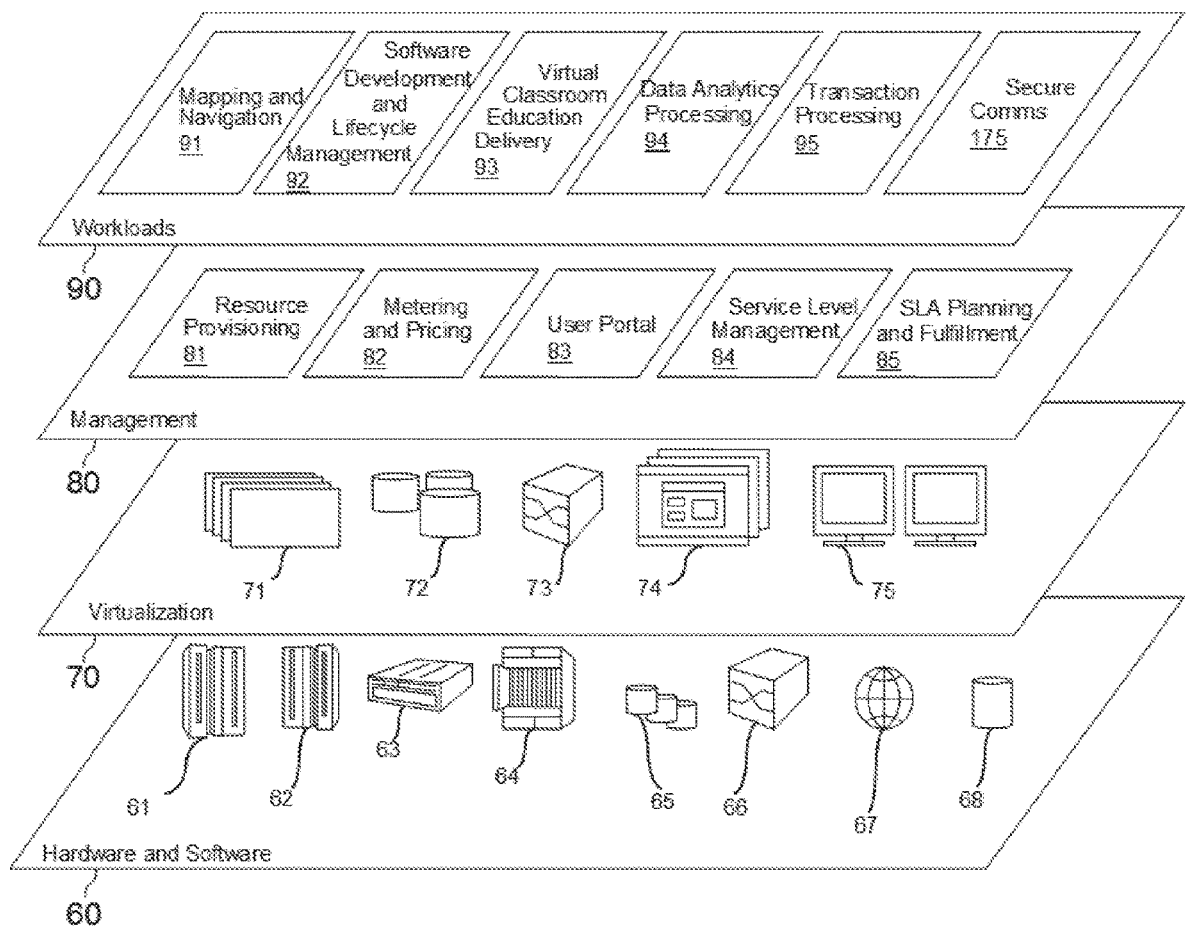
FIG. 3 depicts abstraction model layers, according to an embodiment of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure communications program 175.

Figure 4:
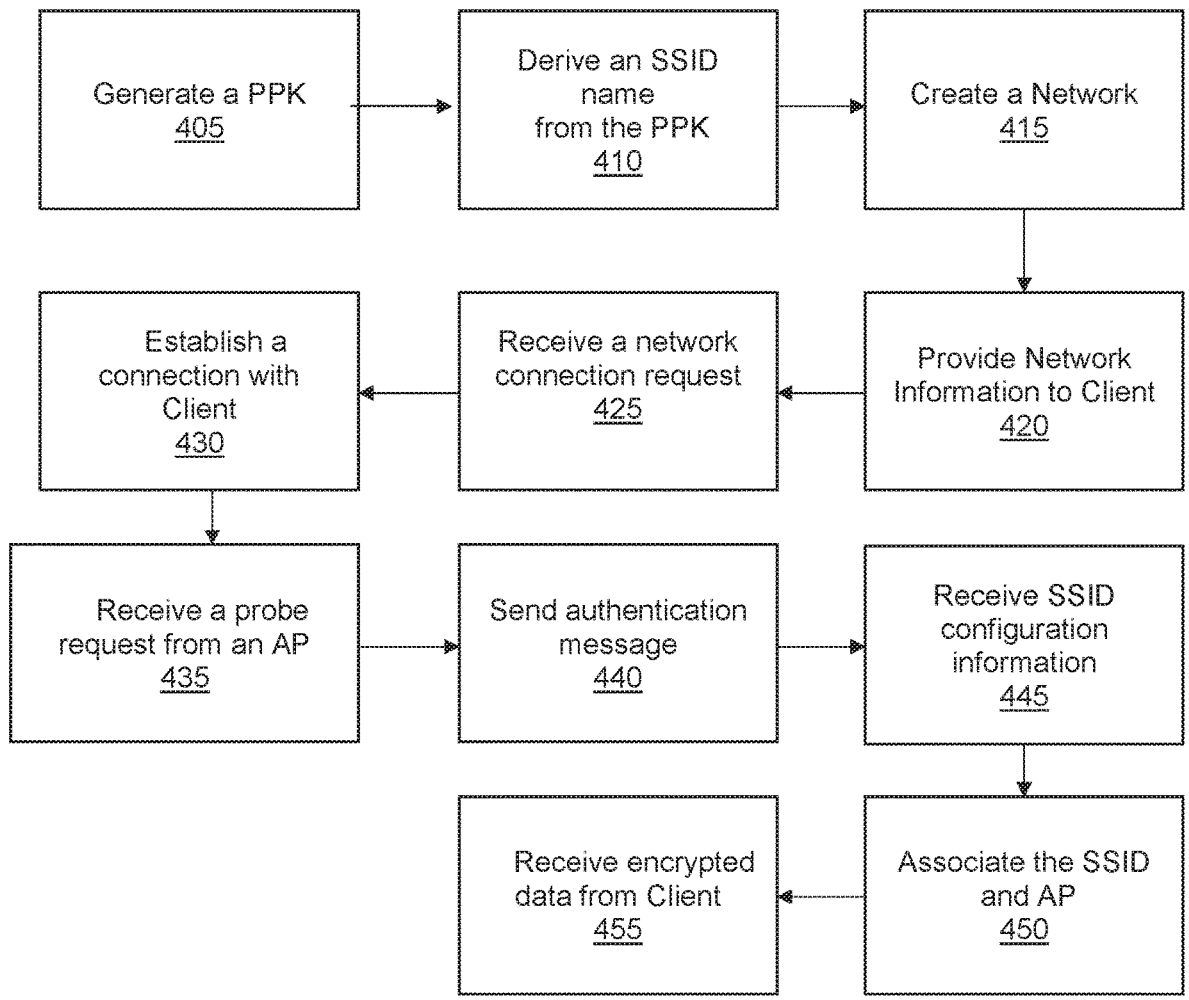
FIG. 4 provides a flowchart depicting operational steps, according to an embodiment of the invention.

The flowchart 400 of FIG. 4 depicts operational steps of an embodiment of the invention. The steps may be performed by one or more host computer processors executing secure communications program 175, client 110 executing client secure communications program 115 and a public hotspot executing hotspot software 125. A PPK is generated by the Host computer at 405. RSA encryption may be used to generate the PPK. An SSID is derived by the Host from the public key at 410. The SSID may be derived as a text translation of a hash of the public key value. At 415, the Host computer creates a WLAN using the derived SSID of 410. Security settings for the WLAN are established by the Host computer. WPA, WPA2, WPA2-PSK are exemplary security types for the WLAN. Security settings may also include an encryption type and a network password. At 420 the SSID and security settings are provided by the Host to a Client. At 425, the Host receives a connection request from the Client using the SSID and security settings information.

A connection between the Host and the Client is established over the SSID WLAN at 430. A network connection probe request from a hotspot network access point (AP) is received by the Host at 435. The Host sends an authentication message to the AP at 440. The authentication message comprises the SSID, the public key, and a digital signature comprising a hash of the SSID combined with the public key. The AP verifies the Host and the SSID using the authentication message and sends a response to the Host which includes SSID configuration information received by the AP from the Client. Receipt of the SSID configuration information by the Host at 445 leads the Host to associate with the AP at 450. The AP is associated with the Client and passes encrypted data from the Client to the Host at 455.

Figure 5:
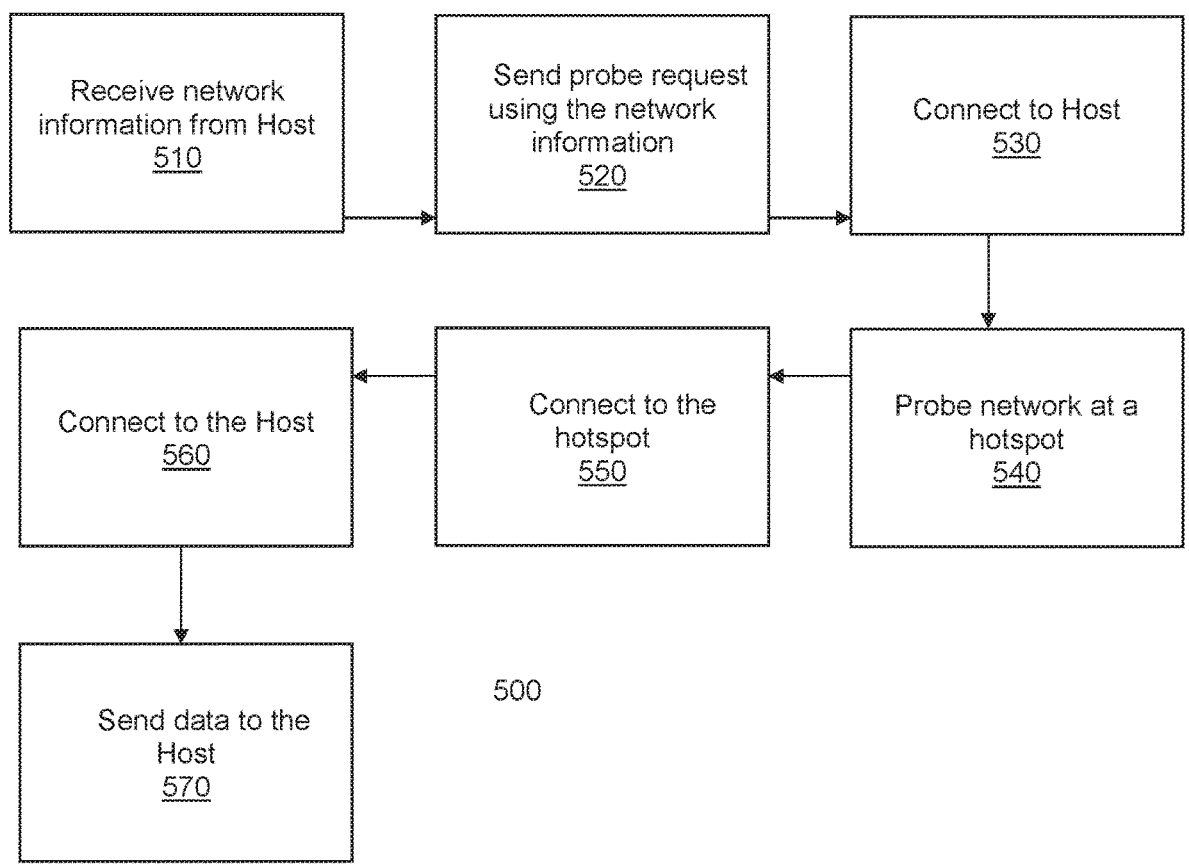
FIG. 5 provides a flowchart depicting operational steps, according to an embodiment of the invention.

The flowchart 500 of FIG. 5 depicts operational steps of an embodiment of the invention. The steps may be performed by one or more host computer processors executing secure communications program 175, client 110 executing client secure communications program 115 and a public hotspot executing hotspot software 125. As illustrated in the flowchart of FIG. 5, a Client device receives network information from a Host at step 510. The network information includes the derived SSID and the accompanying security settings, keys and passwords necessary to access the WLAN. At step 520, the Client sends a probe request to the SSID. After associating with the Host over the SSID, the Client uses the provided information to connect securely to the Host at step 530. After moving out of range of the Host and into range of a public open hotspot, the Client sends a probe request for the SSID at step 540. The Client associates with the hotspot AP at 550, at a low level due to the open security of the hotspot AP. The AP queries the SSID database using the information from the probe request and sends a probe request to the IP address provided by the database. The Host responds with an authentication message comprising the SSID, public key and a digital signature including a hash of the combined SSID and public key. The AP authenticates the Host using the message information. After authenticating the Host, the AP passes security configuration information received from the Client to the Host. The security configuration information enables the Client to re-establish a connection with the Host over the SSID at 560, and thereafter to send encrypted data to the Host at 570.

In an embodiment, a Client node receives SSID and network security settings information from a Host. The Client sends a probe request using the SSID and provided network security settings. The Client connects to the Host using the SSID. Responsive to losing its connection with the Host and acquiring a connection to a public access point, the Client sends a probe request using the SSID and security settings information. The Client connects to the Host using the SSID through the access point and transmits encrypted packet data to the Host through the access point.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for securing public hotspot communications comprising:
   specifying, by one or more computer processors, a service set identifier (SSID) network security setting;
   creating by one or more computer processors, a public-private key pair;
   deriving, by one or more computer processors, an SSID name using the public-private key pair;
   configuring, by the one or more computer processors, an SSID network;
   establishing, by the one or more computer processors, a connection with a client;
   receiving, by one or more computer processors, a request from a public unsecured network access point after the client has travelled beyond a range of the SSID network;
   responsive to receiving the request from the public unsecured network access point after the client has travelled beyond the range of the SSID network, sending, by one or more computer processors, an authentication message to the public unsecured access point, wherein the authentication message comprises the SSID, the public key and a digital signature derived from a hash of a combination of the SSID and the pubic key;
   responsive to sending the authentication message to the public unsecured access point, receiving, by one or more computer processors, SSID configuration information from the client through the public unsecured network access point, wherein the SSID configuration information comprises the SSID network security setting;
   associating, by one or more computer processors, the SSID network and the public unsecured network access point; and
   receiving, by one or more computer processors, data from the client through the public unsecured network access point.

2. The computer implemented method according to claim 1 wherein configuring an SSID network comprises configuring an SSID network using the SSID name and specified network security setting.

3. The computer implemented method according to claim 1 further comprising registering the SSID name by one or more computer processors.

4. The computer implemented method according to claim 1 further comprising:
   providing, by one or more computer processors, the client the SSID name and network security settings; and
   receiving, by one or more computer processors, a network connection request from the client.

5. The computer implemented method according to claim 1 further comprising:
   receiving, by one or more computer processors, encrypted data from the client;
   decrypting, by one or more computer processors, the encrypted data;
   sending, by one or more computer processors, decrypted data to a network element;
   receiving, by one or more computer processors, a response from the network element; and
   sending, by one or more computer processors, the response to the client.

6. The computer implemented method according to claim 5 further comprising one or more computer processors encrypting the response and sending the response to the client.

7. A computer program product for distributing software, the computer program product comprising one or more computer readable storage devices and program instructions stored on the one or more computer readable storage devices, the stored program instructions comprising:
   program instructions for specifying a service set identifier (SSID) security setting;
   program instructions for generating a public-private key pair;
   program instructions for deriving an SSID name using the public-private key pair;
   program instructions for configuring an SSID network;
   program instructions for establishing a connection with a client;
   program instructions for receiving a request from a public network access point after the client has travelled beyond a range of the SSID network;
   program instructions for sending an authentication message comprising the SSID, the public key, and a digital signature derived from a hash of a combination of the SSID and the public key, to the public unsecured access point in response to receiving the request from the public unsecured network access point after the client has travelled beyond the range of the SSID network;
   program instructions for receiving SSID configuration information comprising the SSID network security setting from the client through the public unsecured network access point in response to sending the authentication message to the public unsecured access point;
   program instructions for associating the SSID network and the public unsecured network access point; and
   program instructions for receiving data from the client through the public unsecured network access point.

8. The computer program product according to claim 7, wherein the stored program instructions for configuring an SSID network comprise program instructions for configuring an SSID network using the SSID name and specified network security setting.

9. The computer program product according to claim 7, the stored program instructions further comprising program instructions for registering the SSID name.

10. The computer program product according to claim 7, the stored program instructions further comprising:
    program instructions for providing the client an SSID name and network security setting; and
    program instructions for receiving a network connection request from the client.

11. The computer program product according to claim 7, the stored program instructions further comprising:
- program instructions for receiving encrypted data from client;
- program instructions for decrypting received data;
- program instructions for sending decrypted data to a network element;
- program instructions for receiving a response from the network element; and
- program instructions for sending the response to the client.

12. The computer program product according to claim 11, the stored program instructions further comprising program instructions for encrypting the response and sending the response to the client.

13. A computer system for distributing software, the computer system comprising:
- one or more computer processors;
- one or more computer readable storage devices;
- program instructions stored on the one or more computer readable storage devices for execution by the at least on computer processor, the stored program instructions comprising:
- program instructions for specifying a service set identifier (SSID) security setting;
- program instructions for generating a public-private key pair;
- program instructions for deriving an SSID name using the public-private key pair;
- program instructions for configuring an SSID network;
- program instructions for establishing a connection with a client;
- program instructions for receiving a request from a public unsecured network access point after the client has travelled beyond a range of the SSID network;
- program instructions for sending an authentication message comprising the SSID, the public key and a digital signature derived from a hash of a combination of the SSID and the public key, to the public unsecured access point in response to receiving the request from the public unsecured network access point after the client has travelled beyond the range of the SSID network;
- program instructions for receiving SSID configuration information comprising the SSID network security setting from the client through the public unsecured network access point in response to sending the authentication message to the public unsecured access point;
- program instructions for associating the SSID network and the public unsecured network access point; and
- program instructions for receiving data from the client through the public unsecured network access point.

14. The computer system according to claim 13, wherein the stored program instructions for creating an SSID network comprise program instructions for creating an SSID network using the SSID name and specified network security setting.

15. The computer system according to claim 13, the stored program instructions further comprising program instructions for registering the SSID name.

16. The computer system according to claim 13, the stored program instructions further comprising:
- program instructions for providing the client the SSID name and network security setting to the client; and
- program instructions for receiving a network connection request from the client.

17. The computer system according to claim 13, the stored program instructions further comprising:
- program instructions for receiving encrypted data from the client;
- program instructions for decrypting received data;
- program instructions for sending decrypted data to a network element;
- program instructions for receiving a response from the network element; and
- program instructions for sending the response to the client.

* * * * *